(12) United States Patent
Nogami

(10) Patent No.: US 7,411,875 B2
(45) Date of Patent: Aug. 12, 2008

(54) OPTICAL PICKUP

(75) Inventor: Toyoshi Nogami, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 497 days.

(21) Appl. No.: 11/115,278

(22) Filed: Apr. 27, 2005

(65) Prior Publication Data

US 2005/0243663 A1 Nov. 3, 2005

(30) Foreign Application Priority Data

Apr. 28, 2004 (JP) ............... P2004-132708

(51) Int. Cl.
*G11B 7/00* (2006.01)
(52) U.S. Cl. .................. 369/44.15; 369/44.16
(58) Field of Classification Search ......... None
See application file for complete search history.

(56) References Cited

U.S. PATENT DOCUMENTS 5,323,369 A * 6/1994 Kim ................ 369/44.15

2001/0038581 A1 * 11/2001 Kawano et al. ......... 369/44.16
2004/0062183 A1 * 4/2004 Cheong et al. .......... 369/244
2005/0111311 A1 * 5/2005 Funakoshi ............ 369/44.15

FOREIGN PATENT DOCUMENTS

| JP | A-6-314432 | 11/1994 |
| JP | 7-153097 | 6/1995 |
| JP | 2001-34973 | 2/2001 |
| JP | A-2002-352451 | 12/2002 |

* cited by examiner

*Primary Examiner*—Thang V. Tran
*Assistant Examiner*—Lixi Chow
(74) *Attorney, Agent, or Firm*—Morgan, Lewis & Bockius LLP

(57) ABSTRACT

Wires are inserted through a layer of a damper material filling a space provided in a fixed side support member. The space is formed by a groove shaped cavity, while the front part of the groove shaped cavity is provided with an opening surrounded by a groove shaped surface and a columnar section. The damper material filling the space contacts closely with the groove shaped surface and the columnar section within an opening.

4 Claims, 3 Drawing Sheets

OPTICAL PICKUP

BACKGROUND OF THE INVENTION

1. Field of the Invention

The present invention relates to an optical pickup installed in an optical disk drive and, in particular, to an optical pickup including an actuator in which a movable side lens holder provided with an objective lens is supported in a displaceable manner in a cantilever state by elastic wires extending from a fixed side support member.

2. Description of the Related Art

An optical pickup installed in an optical disk drive is used for focusing laser light on a disk surface serving as a recording medium and thereby for writing and reading data. Such an optical pickup has the function of adjusting the position of the objective lens in the focusing direction or the tracking direction in response to surface deflection and off-centering during the rotation of the disk.

FIG. 4 schematically shows an actuator 1 adopted in a prior art optical pickup. The actuator 1 of the figure is mounted on a base (not shown) driven and thereby traveling in a radial direction of a disk. The actuator 1 includes: a fixed side support member 2 fixed to the base; a movable side lens holder 3 provided with an objective lens 31; a wiring board 4 adhered to the rear end face of the fixed side support member 2; terminal plates 5 and 5 each composed of a wiring board adhered to each of both side faces located in the right and the left direction of the movable side lens holder 3; and electrically conductive wires 6 . . . having elasticity and arranged in the same number on each of the right and left sides of the actuator 1. Further, the movable side lens holder 3 is provided with a plurality of coils (not shown) for generating a biasing force in a focusing direction For a tracking direction T. The end portions of these coils are connected to patterns of the terminal plates 5. A plurality of these wires 6 . . . and these terminal plates 5 are arranged symmetrically on both right and left sides of the actuator 1. In the example of the figure, three wires 6 are arranged on one side. However, although not shown, two wires 6 can be arranged on one side in some cases. Then, one-end portions 61 of the wires 6 are soldered and fixed to lands of the wiring board 4, while the other end portions 62 are soldered and fixed to lands of the terminal plates 5 so that the movable side lens holder 3 is supported in a displaceable manner in the form of a cantilever by the fixed side support member 2 via a plurality of the wires 6 . . . . Numerals 41 and 51 indicate solder. Spaces 7 each having the same volume are arranged in a plurality of sites of each side face located in the right and the left direction of the fixed side support member 2. Three spaces 7 are stacked vertically in three decks each corresponding to each individual wire 6 so that each wire 6 is inserted through the inside of a layer of a damper material (not shown in FIG. 4) filling each individual space 7.

In the actuator 1 of FIG. 4, when an electric current is supplied to the pattern of the wiring board 4, the above-mentioned coils are energized through the wiring board 4, the wires 6, and the terminal plates 5 so that the coils generate a biasing force in the focusing direction or the tracking direction. As a result, the movable side lens holder 5 is driven and displaces in the focusing direction For the tracking direction T together with the objective lens 31.

FIG. 5 is an enlarged horizontal sectional plan view showing the main part of the fixed side support member 2. In the figure, numeral 8 indicates a damper material filling the space 7 (see FIG. 4). The above-mentioned wire 6 is inserted through the inside of the layer of this damper material 8. This damper material 8 is composed of a gel substance of a photo-curing type, thermosetting type, or the like, and provides the effect of suppressing the primary resonance of the wires 6 occurring when the movable side lens holder 3 is driven and displaces by means of the deflection deformation of the wires 6.

Each space 7 provided independently in correspondence to each wire 6 shown in FIG. 4 is composed of a groove shaped cavity surrounded by a groove shaped surface 71 formed in a C shape or an approximate C shape viewed from the front. The entirety of the groove shaped cavities (that is, the spaces 7) is open in the front surface, the rear surface, and a side face of the fixed side support member 2.

Meanwhile, in an optical system supporting apparatus in which a retention member for supporting an optical element such as an objective lens is supported by a support spring having a leaf spring shape, a prior art technique is known that a damping gel material is applied to a retention section provided integrally near an end portion of the support spring so that the control characteristics of the optical system supporting apparatus are stabilized (see Patent Document 1, for example). Further, in an optical system supporting apparatus, a prior art technique has been proposed that an end of an elastic metal member for supporting a lens holder is fixed to a first space region provided in a fixed member with adhesive, and that an elastic gel material is then caused to fill a second space region adjacent to the first space region so that the elastic gel material is prevented from overflowing from the second space region (see JP-A-2002-352451 for example).

As described above, in the prior art example described with reference to FIG. 4, each space 7 for holding the damper material 8 is composed of a groove shaped cavity surrounded by the groove shaped surface 71, while the entirety of the spaces 7 is open in the front surface, the rear surface, and a side face of the fixed side support member 2. Thus, when each space 7 is charged with a fixed amount of the damper material 8 by using these open portions, the surface shape of the damper gel material 8 exposed in each of these open portions of the spaces 7 hardly becomes uniform, so that the situation could have occurred whereby the surface shape of the damper material 8 varies depending on each of the open portions of the spaces 7. For example, the surface shape of the damper material 8 is different among the open portions of the spaces 7 located on one of the right and left sides of the fixed side support member 2. Alternatively, the surface shape of the damper material 8 of the open portions of the space 7 located on one of the right and left sides of the fixed side support member 2 are different from that of the other side.

Further, when such a difference in the surface shape of the damper material 8 occurs in the open portions on the front surface side of the spaces 7, this causes a difference among the wires 6 with respect to the wire length (effective length of the wire) measured between the front surface of the damper material 8 through which the wire 6 is inserted and the portion soldered with the terminal plate 5 in the other end portion 62 of the wire 6 shown in FIG. 4. This causes a difference in the spring constant of each wire 6 imparted to the actuator 1, and hence causes a variation in the primary resonance frequency of the wires 6 or in the so-called DC sensitivity. This causes difficulty in achieving stability in the characteristics required in the actuator 1.

FIG. 5 shows an example of the surface shape of the damper gel material 8 filling a space 7 of the fixed side support member 2 of the prior art actuator 1 described in FIG. 4. In this example, the front surface 81 of the damper gel material 8 in the front surface side open portion 700 of the space 7 has such a curved shape that the surface is located more backward with increasing distance from the rear wall (groove bottom surface) of the groove shaped surface 71. In this case, if the surface of the front surface 81 of the damper gel material 8 is in the same curved shape among the front surface side open portions 700 of the spaces 7, the effective length of the wire 6 becomes the same among the wires 6, and hence almost no variation occurs in the primary resonance frequency of the wires 6 or in the so-called DC sensitivity. In contrast, if the surface of the front surface 81 of the damper gel material 8 filling the space 7 is individually in a different curved shape, the position of the crossing portion of the front surface 81 of the damper material 8 with each wire 6 inserted through the damper material 8 becomes different depending on the wire 6. Thus, the effective length of each wire 6 varies depending on the wire 6, and hence the spring constant of each wire 6 becomes different. This causes a variation in the primary resonance frequency of the wires 6 or in the so-called DC sensitivity, and hence causes instability in the characteristics of the actuator 1. This can degrade the stability in the read and write performance of the optical pickup.

In this point, the technique described in JP-A-6-314432 is merely that the retention portion for the damping gel material is provided in the support spring itself. Thus, this technique is hardly applicable to the prior art example of the actuator 1 described in FIG. 4 where the damper material 8 is caused to fill the space 7 provided in the fixed side support member 2. Even if applicable, the technique cannot avoid the variation in the surface shape of the front surface 81 of the damper material 8.

On the other hand, the technique described in JP-A-2002-352451 is a procedure that an end of an elastic metal member is fixed to a first space region provided in a fixed member with adhesive, and that an elastic gel material is then caused to fill a second space region adjacent to the first space region. This causes the necessity of an extra step of applying the adhesive before the process of filling the elastic gel material, and hence increases complexity in the work.

SUMMARY OF THE INVENTION

The invention has been devised in view of these situations and problems. An object of the invention is as follows. The configuration described in FIG. 4 is used as a basic configuration, while improvement is added to this configuration so that the variation should be suppressed in the surface shape of the front surface of the damper material. By virtue of this, the position of the crossing portion of the front surface of the damper material with each wire inserted through the damper material is made uniform for every wire, so that the effective length of every wire is set to be as identical as possible. As a result, an optical pickup including an actuator is provided in which a variation is suppressed in the primary resonance frequency and in the DC sensitivity caused by the difference in the spring constant in each wire.

Another object of the invention is to provide this means for attaining the above-mentioned object without causing an increase in the number of components used.

An optical pickup includes an actuator in which the other end portions of a plurality of elastic wires one-end portions of which are fixed to a fixed side support member are fixed to a movable side lens holder provided with an objective lens, while these wires are arranged in a manner inserted through an inside of a layer of a damper material filling a space provided in the fixed side support member. The space is formed by a groove shaped cavity which is formed on a side face of the fixed side support member and which extends forward and backward, while a front part of the groove shaped cavity is provided with an opening surrounded by a groove shaped surface which forms the groove shaped cavity and by a columnar section which passes vertically the outside portion of the front end part of the groove shaped surface, and while the damper material filling the space contacts closely with the groove shaped surface and the columnar section within the opening.

In the actuator of the optical pickup of this configuration, the space provided in the fixed side support member is formed by the groove shaped cavity, while the front part of the groove shaped cavity is provided with a small opening surrounded by the groove shaped surface of the groove shaped cavity and the columnar section. Thus, the property such as surface tension causes the damper material filling the space to contact closely with the groove shaped surface and the columnar section within the opening in the front part of the groove shaped cavity. As a result, the shape of the front surface of the damper material becomes uniform. Thus, the position of the crossing portion of the front surface of the damper material with each wire inserted through the damper material becomes uniform for every wire, so that the effective length of every wire is set to be as identical as possible. This suppresses a variation in the primary resonance frequency and in the DC sensitivity caused by the difference in the spring constant in each wire.

In the invention, preferably, the wires of the same number are arranged symmetrically on both right and left sides of the actuator, while a plurality of the wires arranged on the same side of the actuator are inserted through the inside of the layer of the damper material filling one of the groove shaped cavities. According to this configuration, a single space filled with the damper material is sufficient in each of both right and left sides of the actuator. This reduces the number of spaces in comparison with the prior art example, and hence reduces the number of steps of applying the damper material. This simplifies the fabrication process of the actuator. And still, by virtue of providing the columnar section, the effect is obtained that suppresses the variation in the primary resonance frequency and in the DC sensitivity caused by the difference in the spring constant in each wire.

In the invention, preferably, the groove shaped cavity is divided into chambers each corresponding to each wire by partitions provided in a rear part of the columnar section in a manner separated from the columnar section by a gap. According to this configuration, although the damper material is filling a large space composed of the groove shaped cavity, each part of the filling damper material is retained within a chamber divided in correspondence to each wire by the partitions. This avoids the situation that the damper gel material is separated and drops off from the space.

An optical pickup according to the invention is more effectively implemented in the configuration of an optical pickup including an actuator in which the other end portions of a plurality of elastic wires one-end portions of which are fixed to a fixed side support member are fixed to a movable side lens holder provided with an objective lens, while these wires are arranged in a manner inserted through an inside of a layer of a damper material filling a space provided in the fixed side support member, wherein the space is formed by a groove shaped cavity which is formed on a side face of the fixed side support member and which extends forward and backward, while a front part of the groove shaped cavity is provided with an opening surrounded by a groove shaped surface which forms the groove shaped cavity and by a columnar section which passes vertically the outside portion of the front end part of the groove shaped surface, and wherein the wires of the same number are arranged symmetrically on both right and left sides of the actuator, while a plurality of the wires arranged on the same side of the actuator are inserted through the inside of the layer of the damper material filling one of the groove shaped cavities, and while the groove shaped cavity is divided into chambers each corresponding to each wire by partitions provided in a rear part of the columnar section in a manner separated from the columnar section by a gap, whereby the damper material filling the space contacts closely with the groove shaped surface and the columnar section within the opening, while the layer of the damper material continues across from a vertical passage space formed between the columnar section and the partitions to the chambers. The effects and the like of the invention are described in detail with reference to the embodiment described later.

EFFECTS OF THE INVENTION

According to the invention, the configuration described in FIG. 4 is used as a basic configuration. Then, a columnar section is added to the portion for the formation of the spaces in the fixed side support member, and the spaces are combined into one while partitions are added. When merely such simple measures are taken, the variation is suppressed in the front surface shape of the damper material filling the space so that the effective length of a plurality of the wires becomes as identical as possible. This suppresses the variation in the primary resonance frequency and in the DC sensitivity caused by the difference in the spring constant in each wire, and hence improves the stability in the read and write performance of the optical pickup.

Further, when the groove shaped cavity which forms the space is divided into the chambers by the partitions, the damper gel material filling the space engages with the partitions so that an anchor effect is obtained. This avoids the possibility of occurrence of a defective such as drop off of a damper material from the space, and hence improves the durability of the actuator and the stability in the performance.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
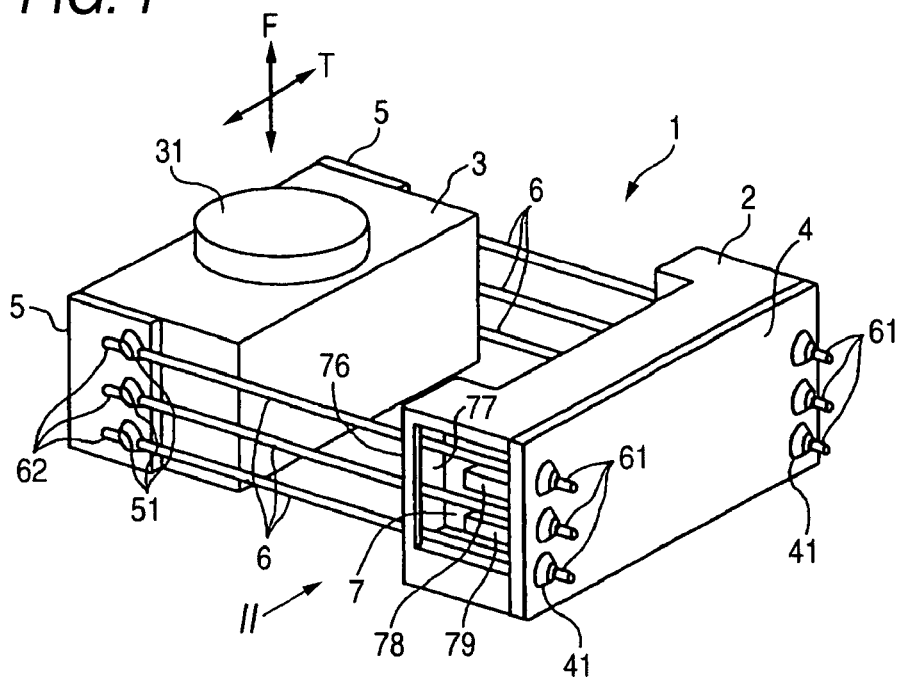
FIG. 1 is a schematic perspective view of an actuator adopted in an optical pickup according to the invention.
Figure 2:
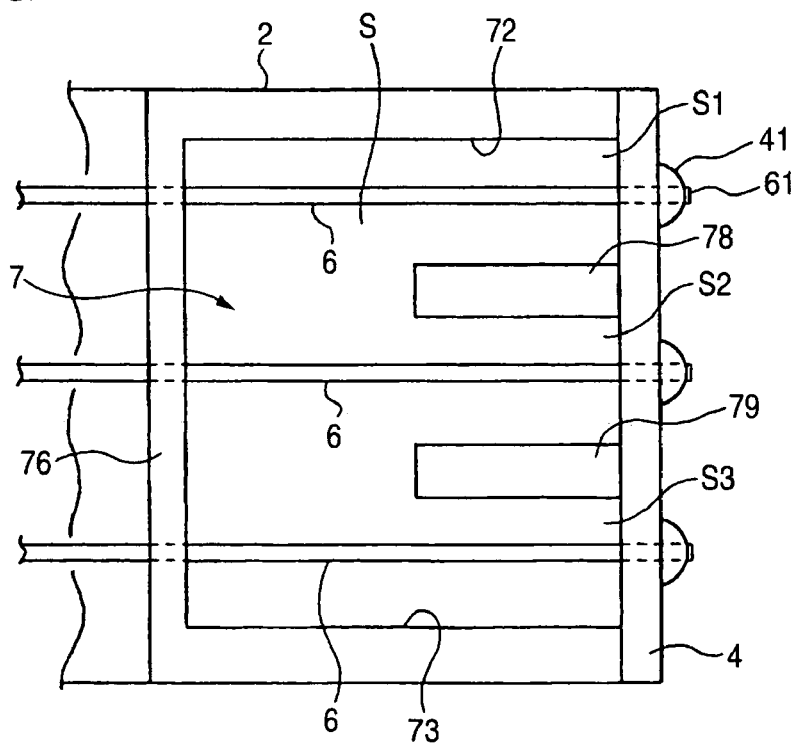
FIG. 2 is an enlarged side view of the main part of an actuator viewed from the II direction of FIG. 1.
Figure 3:
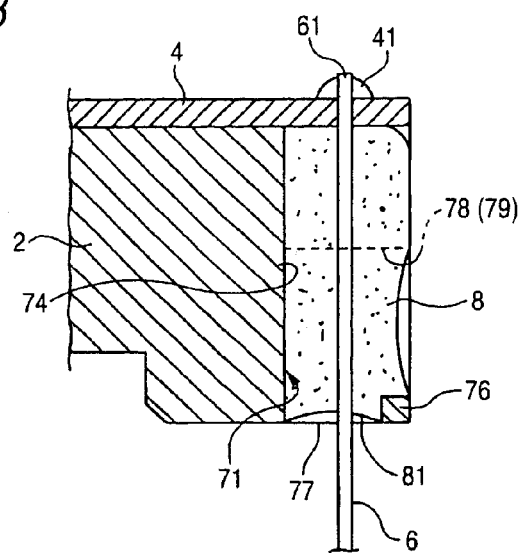
FIG. 3 is an enlarged horizontal sectional plan view showing the main part of a fixed side support member.

FIG. 1 is a schematic perspective view of an actuator 1 adopted in an optical pickup according to the invention. FIG. 2 is an enlarged side view of the main part of an actuator 1 viewed from the II direction of FIG. 1. FIG. 3 is an enlarged horizontal sectional plan view showing the main part of a fixed side support member 2.

Figure 4:
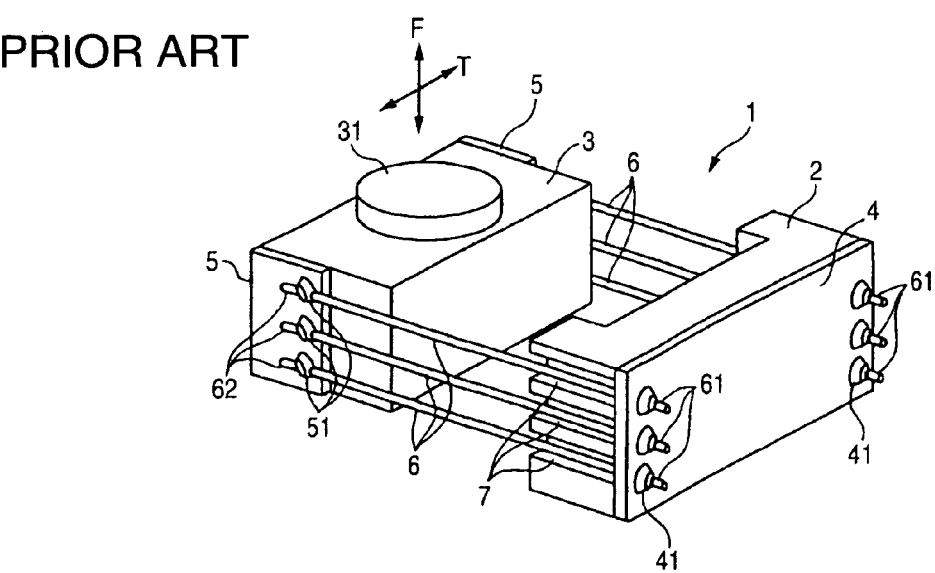
FIG. 4 is a schematic perspective view of an actuator adopted in a prior art optical pickup.
Figure 5:
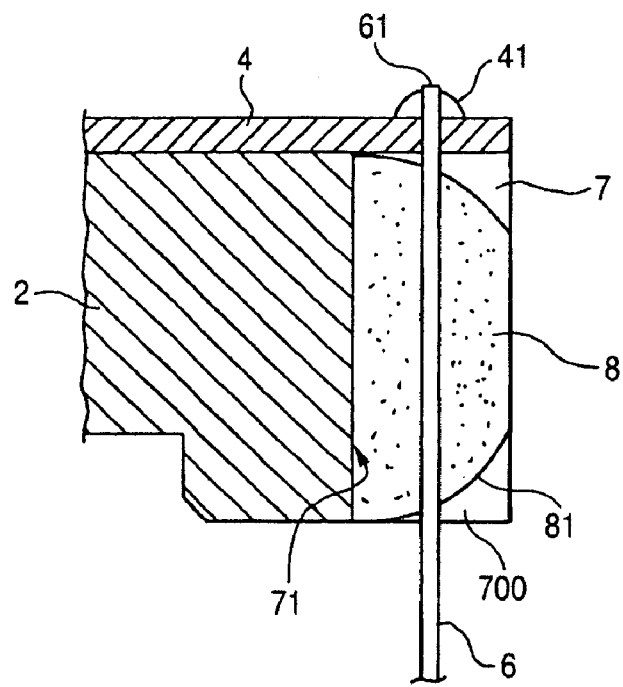
FIG. 5 is an enlarged horizontal sectional plan view showing the main part of a fixed side support member of FIG. 4.

In the actuator 1 of FIG. 1, the difference from the actuator 1 described in FIG. 4 is only the configuration of a space 7 formed in each of both side faces located in the right and the left direction of the fixed side support member 2. The other points are the same as those described in FIG. 4. That is, also in the present embodiment, the fixed side support member 2 of the actuator 1 is mounted on a base (not shown) driven and thereby traveling in a radial direction of a disk. Further, a movable side lens holder 3 is provided with a plurality of coils (not shown) for generating a biasing force in a focusing direction F or a tracking direction T. The end portions of these coils are connected to patterns of terminal plates 5. One-end portions 61 of the wires 6 are soldered and fixed to the lands of a wiring board 4. The other end portions 62 of the wires 6 are soldered and fixed to the lands of the terminal plate 5. Thus, in the actuator 1 of FIG. 1, when an electric current is supplied to the pattern of the wiring board 4, the coils are energized through the wiring board 4, the wires 6 . . . , and the terminal plates 5 and 5 so that the coils generate a biasing force in the focusing direction F or the tracking direction T. As a result, the movable side lens holder 5 together with the objective lens 31 is driven and displaces in the focusing direction F or the tracking direction T by virtue of the displacement of the wires 6 . . . .

In this embodiment, the space 7 formed in each of both side faces located in the right and the left direction of the fixed side support member 2 is formed by a groove shaped cavity surrounded by a groove shaped surface 71 which extends forward and backward throughout the fixed side support member 2. When viewed from the front, the groove shaped surface 71 is formed in a C shape or an approximate C shape by an upper surface 72, a lower surface 73, and a groove bottom surface 74. This point is the same as described in FIG. 4.

As shown in FIGS. 1-3, in this embodiment, one single space 7 is formed in each of the both side faces located in the right and the left direction of the fixed side support member 2. Then, the front part of the groove shaped cavity which forms the space 7 is provided with an opening 77 surrounded by a groove shaped surface 71 which forms the groove shaped cavity and by a columnar section 76 which passes vertically the outside portion of the front end part of the groove shaped surface 71. The space 7 has a vertical length equal to the vertical length between the upper surface of the uppermost space 7 and the lower surface of the lowermost space 7 among the three spaces 7 provided on each of the right and left sides of the fixed side support member 2 described in FIG. 4. Thus, the opening 77 has a narrow and elongated shape. Then, wires 6 of the same number (three wires each in the example of the figure) arranged symmetrically on both right and left sides of the actuator 1 are arranged on each of the right and left spaces 7, while the one-end portions 61 of the wires 6 are soldered and fixed to the lands of the wiring board 4. The latter half part of each space 7 is divided into three vertically stacked chambers S1, S2, and S3 by partitions 78 and 79 provided in the fixed side support member 2 in a manner separated from the columnar section 76 by a gap. Each wire 6 is independently arranged in each of the chambers S1, S2, and S3. Then, a plurality of the wires 6 arranged on the same side of the actuator 1 are inserted through the inside of the layer of the block of the damper material 8 filling one of the groove shaped cavities. The damper gel material 8 filling one space 7 contacts closely with the groove shaped surface 71 and the columnar section 76 within the opening 77 as shown in FIG. 3. Further, the layer of the damper material 8 continues across from the vertical passage space S formed between the columnar section 76 and the partitions 78 and 79 to the chambers S1, S2, and S3.

The work for filling one space 7 with the damper material 8 is achieved by a single filling step. Owing to a property such as surface tension in the damper material 8, the damper material 8 filling the one space 7 contacts closely with the groove wall surface 71 and the columnar section 76 within the opening 77. Thus, the surface shape of the front surface 81 of the damper material 8 becomes identical or approximately identical between the right and left spaces 1. That is, a situation does not occur that the surface shape is notably different between the right and left spaces 1. The situation does not happen, n particular, the opening 77 has a narrow horizontal width, and hence the shape becomes the same between the right and the left at every vertical position. As such, when the surface shape of the front surface 81 of the damper material 8 is identical or approximately identical between the right and left spaces 1, the position of the crossing portion of the front surface 81 of the damper material 8 with each wire 6 inserted through the damper material 8 becomes identical for every wire 6. Thus, the effective length becomes as uniform as possible between the wires 6 located on one of the right and left sides of the actuator 1 or between the wires 6 located on the right and left sides. This suppresses a variation in the primary resonance frequency and in the DC sensitivity caused by the difference in the spring constant in each wire 6.

Further, in the space 7, the layer of the damper material 8 fills and continues across from the vertical passage space S to the chambers S1, 52, and S3. Thus, the damper material 8 filling the chambers S1, S2, and S3 engages with the partitions 78 and 79 and the chambers S1, S2, and S3, and thereby provides an anchor effect. This avoids the possibility of occurrence of a defective such as drop off of a damper material 8 from the space 7.

The present embodiment has been described for the case that the three wires 6 each are arranged symmetrically on both right and left sides of the actuator 1. However, the number of the wires is not limited to this. Further, an example has been given that the latter half part of space 7 is divided into a stack of a plurality of chambers S1, S2, and S3 by the partitions 78 and 79. However, the partitions 78 and 79 may be omitted so that the entire space 7 may be formed as a chamber not divided by the partitions.

Further, each of the three spaces 7 provided on each of the right and left sides of the fixed side support member 2 described in FIG. 4 may be provided with a columnar section so that an opening may be formed in each of the spaces 7. Then, within each opening, the damper material filling each space 7 may contact closely with the groove shaped surface 71 and the columnar section.

What is claimed is:

1. An optical pickup comprising:
an objective lens; and
an actuator including: a plurality of elastic wires; a fixed side support member; and a movable side lens holder provided with the objective lens, wherein:
one-end portions of the plurality of elastic wires are fixed to the movable side lens holder;
another-end portions of the plurality of elastic wires are fixed to the fixed side support member;
the plurality of elastic wires are arranged in a manner inserted through an inside of a layer of a damper material filling a space provided in the fixed side support member;
the space is formed by a groove shaped cavity which is formed on a side face of the fixed side support member and which extends forward and backward, while a front part of the groove shaped cavity is provided with an opening surrounded by a groove shaped surface which forms the groove shaped cavity and by a columnar section which passes vertically the outside portion of the front end part of the groove shaped surface;
the wires of the same number are arranged symmetrically on both right and left sides of the actuator, while a plurality of the wires arranged on the same side of the actuator are inserted through the inside of the layer of the damper material filling one of the groove shaped cavities, and while the groove shaped cavity is divided into chambers each corresponding to each wire by partitions provided in a rear part of the columnar section in a manner separated from the columnar section by a gap; and
the damper material filling the space contacts closely with the groove shaped surface and the columnar section within the opening, while the layer of the damper material continues across from a vertical passage space formed between the columnar section and the partitions to the chambers.

2. An optical pickup comprising:
an objective lens; and
an actuator including: a plurality of elastic wires; a fixed side support member; and a movable side lens holder provided with the objective lens, wherein:
one-end portions of the plurality of elastic wires are fixed to the movable side lens holder;
another-end portions of the plurality of elastic wires are fixed to the fixed side support member;
the plurality of elastic wires are arranged in a manner inserted through an inside of a layer of a damper material filling a space provided in the fixed side support member; and
the space is formed by a groove shaped cavity which is formed on a side face of the fixed side support member and which extends forward and backward, while a front part of the groove shaped cavity is provided with an opening surrounded by a groove shaped surface which forms the groove shaped cavity and by a columnar section which passes vertically the outside portion of the front end part of the groove shaped surface, and while the damper material filling the space contacts closely with the groove shaped surface and the columnar section within the opening.

3. The optical pickup according to claim 2, wherein the wires of the same number are arranged symmetrically on both right and left sides of the actuator, while a plurality of the wires arranged on the same side of the actuator are inserted through the inside of the layer of the damper material filling one of the groove shaped cavities.

4. The optical pickup according to claim 3, wherein the groove shaped cavity is divided into chambers each corresponding to each wire by partitions provided in a rear part of the columnar section in a manner separated from the columnar section by a gap.

* * * * *